(12) United States Patent
Deshpande et al.

(10) Patent No.: US 10,956,850 B2
(45) Date of Patent: Mar. 23, 2021

(54) CAUSAL PERFORMANCE ANALYSIS APPROACH FOR STORE MERCHANDIZING ANALYSIS

(71) Applicant: International Business Machines Corporation, Armonk, NY (US)

(72) Inventors: Ajay A. Deshpande, White Plains, NY (US); Hongliang Fei, Sunnyvale, CA (US); Arun Hampapur, Norwalk, CT (US); Hongfei Li, Briarcliff Manor, NY (US); Xuan Liu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 15/334,367

(22) Filed: Oct. 26, 2016

(65) Prior Publication Data

US 2017/0330124 A1 Nov. 16, 2017

Related U.S. Application Data (60) Provisional application No. 62/336,998, filed on May 16, 2016.

(51) Int. Cl.
*G06Q 10/06* (2012.01)

(52) U.S. Cl.
CPC .. *G06Q 10/06393* (2013.01); *G06Q 10/06315* (2013.01)

(58) Field of Classification Search
None
See application file for complete search history.

(56) References Cited

U.S. PATENT DOCUMENTS

| 8,214,238 | B1 * | 7/2012 | Fairfield | G06Q 10/0639 |
| | | | | 705/7.11 |
| 2001/0047293 | A1 * | 11/2001 | Waller | G06Q 20/203 |
| | | | | 705/22 |

(Continued)

FOREIGN PATENT DOCUMENTS

KR 20030076972 A * 9/2003 ............. G06F 17/60

OTHER PUBLICATIONS

Shari Waters. How Same-Store Sales Figures Are Used in Retail. The measurement lets retailers understand year-over-year performance. https://www.thebalancesmb.com/what-are-comparable-store-sales-2890181. (Year: 2019).*

(Continued)

*Primary Examiner* — Patricia H Munson
*Assistant Examiner* — Nancy N Prasad
(74) *Attorney, Agent, or Firm* — Scully, Scott, Murphy & Presser, P.C.; Joseph Petrokaitis (57) ABSTRACT

Causal performance analysis for store merchandising may be provided. A clustering technique may be performed based on target store location data and existing store data. Based on the clustering technique, a peer selection group is determined comprising a group of stores determined to have similar attributes to the target store location. Sales distortions for a plurality of divisions associated with the group of stores in the peer selection group may be determined. A distortion matrix may be generated comprising a ranked list of the plurality of divisions. A merchandise mix recommendation for the target store location may be presented via a user interface device.

17 Claims, 6 Drawing Sheets

(56) References Cited

U.S. PATENT DOCUMENTS

2004/0078796 A1* 4/2004 Utsumi ............... G06Q 10/06
                                                 718/105
2008/0077555 A1* 3/2008 Miller ................ G06Q 10/06
2010/0318403 A1* 12/2010 Bottom ............... G06Q 30/02
                                                 705/7.36
2015/0100907 A1* 4/2015 Erenrich ............. G06F 3/0484
                                                 715/765

OTHER PUBLICATIONS

Capgemini, "Customer-Centric Assortment Planning", https://www.capgemini-consulting.com/resource-file-access/resource/pdf/tl_Customer-Centric_Assortment_Planning.pdf, Printed on May 16, 2016, 4 pages.

Donofrio, T.J., "Retail Systems and Services (RS&S)", http://risnews.edgl.com/retail-news/Advanced-Planning-and-Optimization-Part-3—Store-Clustering38904, Retail Info Systems News, Sep. 9, 2009, 9 pages.

Mapinfo, "Store Clustering", http://resource.mapinfo.com/static/files/document/1194540613429/StoreClustering.IS.8.23.pdf, Pitney Bowes MapInfo Corporation, Printed on May 16, 2016, 2 pages.

Pollack, J., "Retail Clustering Methods Achieving Success with Assortment Planning", http://www.parkeravery.com/pov_Retail_Clustering_Methods.html, The Parker Avery Group, Printed on May 16, 2016, 8 pages.

* cited by examiner

CAUSAL PERFORMANCE ANALYSIS APPROACH FOR STORE MERCHANDIZING ANALYSIS

CROSS-REFERENCE TO RELATED APPLICATIONS

This application claims the benefit of U.S. Provisional Application No. 62/336,998, filed on May 16, 2016, which is incorporated by reference herein in its entirety.

BACKGROUND

The present application relates generally to computers and computer applications, and more particularly to causal performance analysis.

In establishing or opening a new section in a store or a new store and planning for merchandises, retailers often need to determine which sections or departments should be most aggressively merchandised and the reason, the distortions at a department or division level, and those sections or departments that need readjustment. An automated methodology enabling such determinations would be desirable.

BRIEF SUMMARY

A method and system of providing causal performance analysis for store merchandising may be provided. The method, in one aspect, may include receiving via a communication network target store location data associated with a target store location. The method may also include receiving via the communication network existing store data associated with a plurality of existing stores. The method may further include performing a clustering technique based on the target store location data and the existing store data. The method may also include, based on the clustering technique, determining a peer selection group comprising a group of stores determined to have similar attributes to the target store location. The method may also include determining sales distortions for a plurality of divisions associated with the group of stores in the peer selection group. The method may further include generating a distortion matrix comprising a ranked list of the plurality of divisions. The method may further include presenting via a user interface device, a merchandise mix recommendation for the target store location, the merchandise mix recommendation determined based on the distortion matrix.

A system providing causal performance analysis for store merchandising, in one aspect, may include one or more hardware processors communicatively coupled to a communication network. One or more of the hardware processors may be operable to receive via the communication network target store location data associated with a target store location. One or more of the hardware processors may be further operable to receive via the communication network existing store data associated with a plurality of existing stores. One or more of the hardware processors may be further operable to perform a clustering technique based on the target store location data and the existing store data. One or more of the hardware processors may be further operable to, based on the clustering technique, determine a peer selection group comprising a group of stores determined to have similar attributes to the target store location. One or more of the hardware processors may be further operable to determine sales distortions for a plurality of divisions associated with the group of stores in the peer selection group. One or more of the hardware processors may be further operable to generate a distortion matrix comprising a ranked list of the plurality of divisions. One or more of the hardware processors may be further operable to present via a user interface device, a merchandise mix recommendation for the target store location, the merchandise mix recommendation determined based on the distortion matrix.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method, computer program product, and/or techniques may be provided that perform causal performance analysis to aid in merchandising in a store location, for example, a new store location, or a new department or section in an existing store location. A methodology in one embodiment of the present disclosure, for example, may leverage the regional information such as demographics and competitors, and the sales information in the existing chain stores to plan merchandise in the new store location. In one embodiment, the methodology may find a peer selection group from the existing stores that has similar regional attributes as the new store location, or new department, and use sales distortion analysis at the department or division level to find top or bottom candidates. In one embodiment, the methodology may include implementing and performing a what-if analysis to determine or forecast revenue or sales projections. The methodology may also be implemented to improve merchandise planning in an existing store location.

Figure 1:
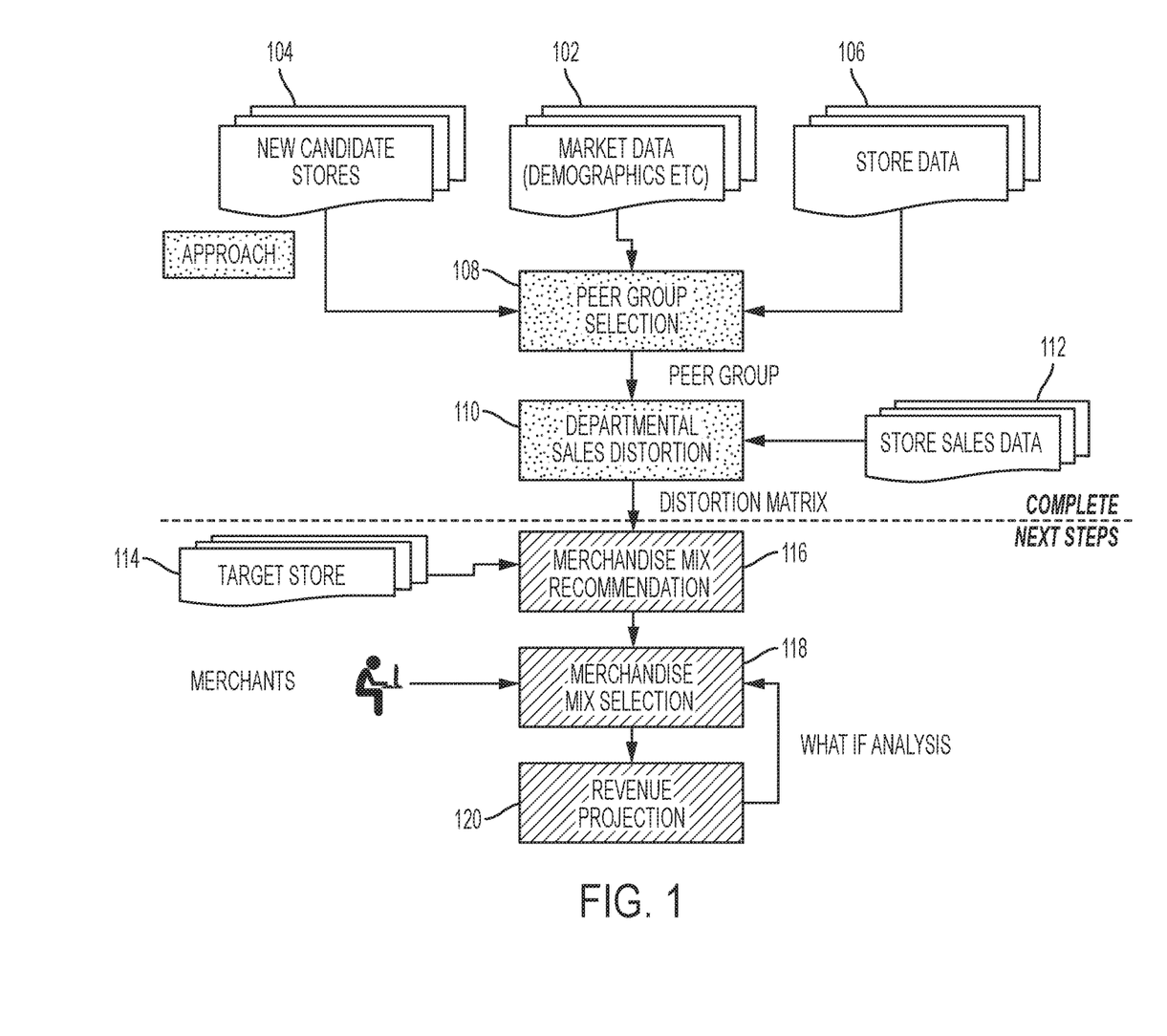
FIG. 1 is a diagram illustrating components of a system in one embodiment of the present disclosure.

FIG. 1 is a diagram illustrating components of a system in one embodiment of the present disclosure. The system in one embodiment may obtain market data 102 such demographic data, competitor data and other regional information, information about new candidate store (or department within a store) 104 and information about existing store data 106. In one aspect, new candidate store is specified by location (latitude/longitude) and/or zipcode. The various attributes of "store data" that are used to perform clustering may include: population, competitors within a defined distance (e.g., 5, 10, or 15 miles), different competitor types, and/or other attributes. This may include several of the attributes available in the census data.

A peer group selection process or module may execute on one or more hardware processors and selects, based on the market data 102, new candidate store data 104 and store data 106, a peer group that reflects trends in a new store location. For instance, the system may use the new store location data 104 to capture the relevant demographics and competitor and other regional information such as population growth data. The system may combine the new store location data 104 with the corresponding information at the existing store locations (shown as store data at 106) to find a peer selection group. A peer selection group refers to a group of stores that have similar attributes such as demographic characteristics as the new location. In one embodiment, one or more clustering techniques may be employed to find the peer selection group. Other techniques may be employed. In one embodiment, each demographic feature across all stores is first normalized. For example, population data can be normalized across all stores such that the values fall in the range 0 to 1. This is possible for every attribute. Based on the normalized attributes, one of the existing algorithms for clustering (e.g. hierarchical clustering) is executed to find the clusters of similar stores. Hierarchical clustering is a popular method for clustering in machine learning literature for attributes that are made up of numerical values as well non-numerical attributes.

A distortion process or module 110 may execute on one or more hardware processors and performs sales distortion analysis for the peer group level and at the overall stores group level, ranking department/divisions (or another hierarchy level) in different ways which help in selecting one or more top or bottom candidates, eliminating, and/or readjusting one or more top or bottom candidates. The distortion process or module 110 in one embodiment outputs a distortion matrix. The distortion in one embodiment may include the following: Consider as an example, in the peer group the average sales for a department is $1.5M. And consider in the group of all stores, the average sales for the same department is $1.2M. In comparison with an average store, a store in the first peer group performs 1.25 times better. The distortion is defined as 0.25 in this example. In one embodiment, it is determined as (peer group sales)/(average sales)−1. If the sales in the peer group are lower than the average then, the distortion will be a negative number.

For instance, the distortion process 110 may determine or compute the average aggregated sales at the department or division level for the peer group, and also at all the stores, based on the past sales information of all the stores 112. Examples of departments or divisions may include, but are not limited to, clothing, houseware, furniture, electric appliance, electronics, luggage, jewelry, accessories, cosmetics, shoes, and/or others. The distortion process 110 may employ one or more normalization techniques to compute or determine normalized sales at those levels and determine or compute sales distortions by comparing between the peer group and all stores put together. The distortion process 110 may rank these metrics along different dimensions (e.g., overall sales fraction and distortions) and generate the distortion matrix that comprises the ranked metrics along different dimensions. The distortion matrix can be used to select and/or readjust the candidate departments, for example, the top or bottom or another candidate department for merchandising.

A merchandise mix recommendation process or module 116 may run on one or more hardware processors and recommend a merchandise mix for one or more target stores 114 based on the distortion matrix. A target store 114 is an input to the merchandise mix recommendation process or module 116 and is one that is being configured. As an example for merchandize mix, consider the department of jeans, the department of polo t-shirts, the department of bedsheets, and others. Merchandize mix is tells how much mix (e.g., percentage (%)) of the total budget is to be invested in each of these departments.

In one embodiment, a what-if-analysis may be performed on one or more hardware processors with the sales distortion analysis to forecast or project revenue at the new store location (or a new department within a store location) based on a budget allocation. The budget allocation is an input to the what-if-analysis. The sales projection from the what-if-analysis, for example, may be used in merchandise planning for the new store location. What-if-analysis, for example, may include a merchandise mix selection module 118 running on one or more hardware processors that may automatically select a merchandise mix, for example, recommended by the merchandise mix recommendation process 116. In another aspect, the merchandise mix selection process or module 118 may include a user interface that interacts with a user, and receives merchandise mix selection from the user. For instance, the recommended merchandise mix generated by the merchandise mix recommendation process 116 may be provided to the user via the user interface, and the user allowed to input a selected merchandise mix on the user interface. What-if analysis may also include a revenue projection process or module 120 running on one or more hardware processors that projects revenue or sales for a target store with the selected merchandise mix. The forecasted or predicted sales or revenue data may be presented to the user via the user interface. In one embodiment, the user may iterate or repeat the what-if-analysis based on different merchandise mix selection. In one embodiment, the what-if-analysis may be an automatic procedure, in which the revenue projection is repeated or iteratively performed for a number of merchandise mix selections.

In one embodiment, department or store distortion computation and merchandise mix recommendation may be performed as follows. Department sales percentage (DSP) may be determined as an average sales of each department divided by an average sales of all departments (total store):

Department sales percentage (DSP)=average sales of each department/average sales of all departments (total store).

Department performance index (DPI) may be determined as the department sales percentage (DSP) in peer group divided by DSP for all stores:

Department Performance Index (DPI)=DSP in peer group/DSP for all stores

From the clustering, the selection of the peer group is determined. DSP in peer group may be determined as the average sale in each department across the stores. DSP for all stores may be determined similarly, e.g., for the overall average where all the stores are considered.

Distortion formula may be generated, for example, that include the following:
Distortion formula is set to 1 (or another value), if DPI>=1.1 (or another first threshold value);
Distortion formula is set to 0 (or another value), if DPI<1.1 and DPI>0.9 (or another first and second threshold values);
Distortion formula is set to −1 (or another value), if DPI<0.9 (or another second threshold value).

Potential actions then may be recommended as merchandise mix recommendation, for example, as follows:

If the distortion formula is 1, maximize strong departments;

If the distortion formula is 0, right-size for space constraints, e.g., 0 means that the methodology may use the default size investment (same as average group) in that particular department;

If the distortion formula is −1, minimize of eliminate weak departments, and offer convenience assortments at most.

Figure 2:
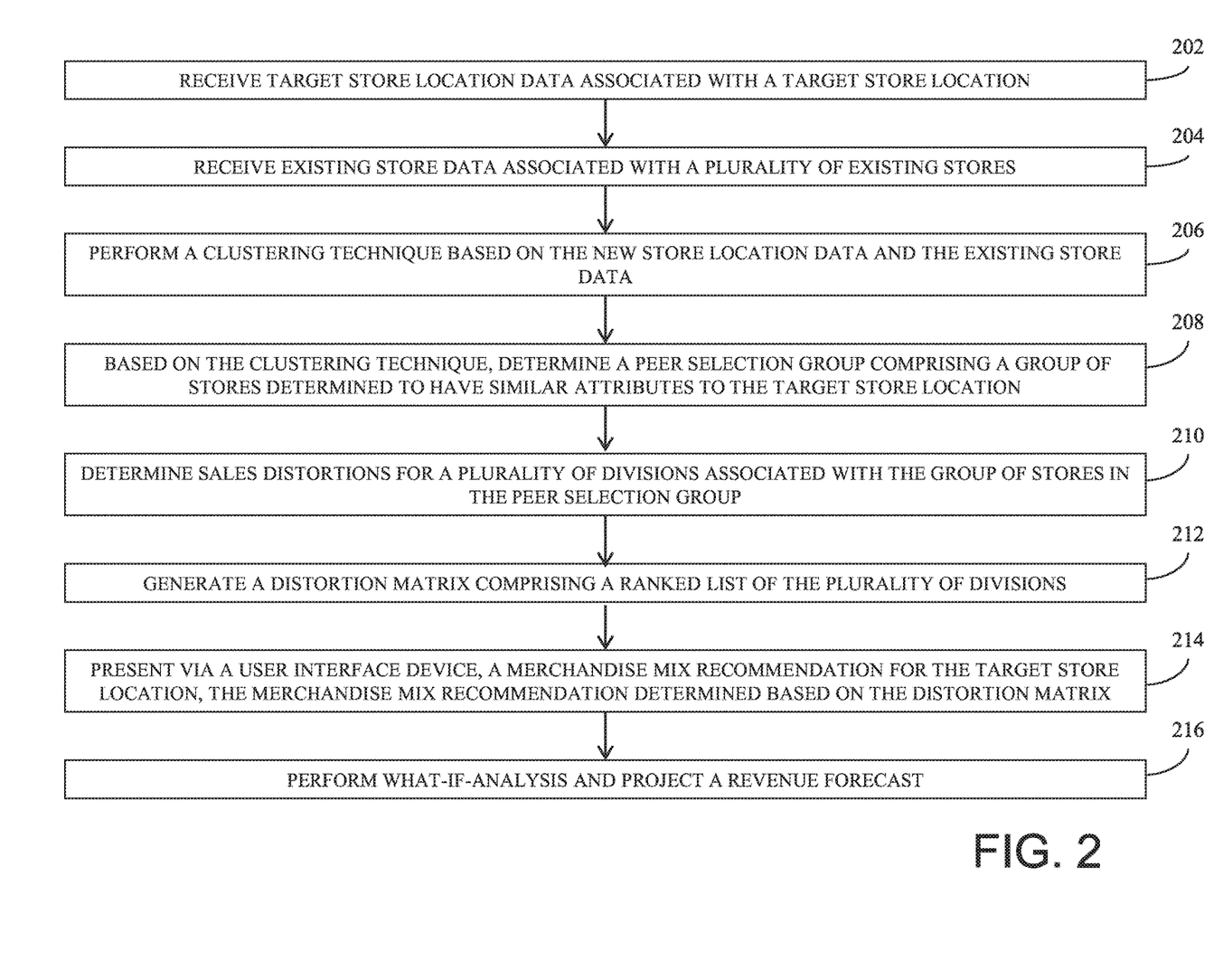
FIG. 2 is a flow diagram illustrating a method of the present disclosure in one embodiment.

FIG. 2 is a flow diagram illustrating a method of the present disclosure in one embodiment. The method in one embodiment is performed automatically by one or more hardware processors. At 202, store location data for a target store (e.g., a new store under consideration or a store within which a department or division is under consideration) is received, for example, over a communication network, for example, by one or more hardware processors. The data may include demographic data associated with the location.

At 204, existing store data associated with a plurality of existing stores by one or more of the hardware processors. The store data, for example, may include demographic data associated with the locations of the existing stores and the sales data associated with those stores.

At 206, a clustering technique may be performed by one or more of the hardware processors, based on the target store location data and the existing store data.

At 208, based on the clustering technique, a peer selection group is determined by one or more of the hardware processors. The peer selection group in one embodiment includes a group of stores determined to have similar attributes to the target store location. Similarity may be determined based on a defined threshold value used in the technique that finds the peer selection group.

At 210, sales distortions for a plurality of divisions associated with the group of stores in the peer selection group may be determined by one or more of the hardware processors. For example, a sales distortion attribute may be computed for each of a plurality of departments in a store in the peer selection group, for example, for all stores in the peer selection group. In one embodiment, a performance index per division in the plurality of divisions may be determined as a ratio of the division's sales percentage in the peer selection group and division's sales percentage for all stores.

At 212, a distortion matrix may be generated by one or more of the hardware processors. The distortion matrix may include a ranked list of the plurality of divisions.

At 214, a merchandise mix recommendation for the target store location determined based on the distortion matrix may be presented by one or more of the hardware processors via a user interface device. For example, the merchandise mix recommendation may include recommending to maximize the division, responsive to determining that the performance index associated with the division is greater than a first threshold value. The first threshold value may be configurable. As another example, he merchandise mix recommendation may include recommending to consider merchandising based on a space constraint, responsive to determining that the performance index falls between a first threshold value and a second threshold value. The second threshold value may be configurable. As yet another example, the merchandise mix recommendation may include recommending to minimize the division responsive to determining that the performance index associated with the division is less than the second threshold value.

At 216, what-if-analysis may be performed and a revenue forecast may be projected. For example, the method may include automatically selecting the merchandise mix recommendation and performing a what-if-analysis to project a forecast of revenue associated with merchandising performed according to the merchandise mix recommendation, and presenting the forecast of revenue via the user interface device. In another aspect, a user may be allowed to select the merchandise mix recommendation via the user interface device, and based on the user selected merchandise mix recommendation, a what-if-analysis to project a forecast of revenue based be performed.

Figure 6:
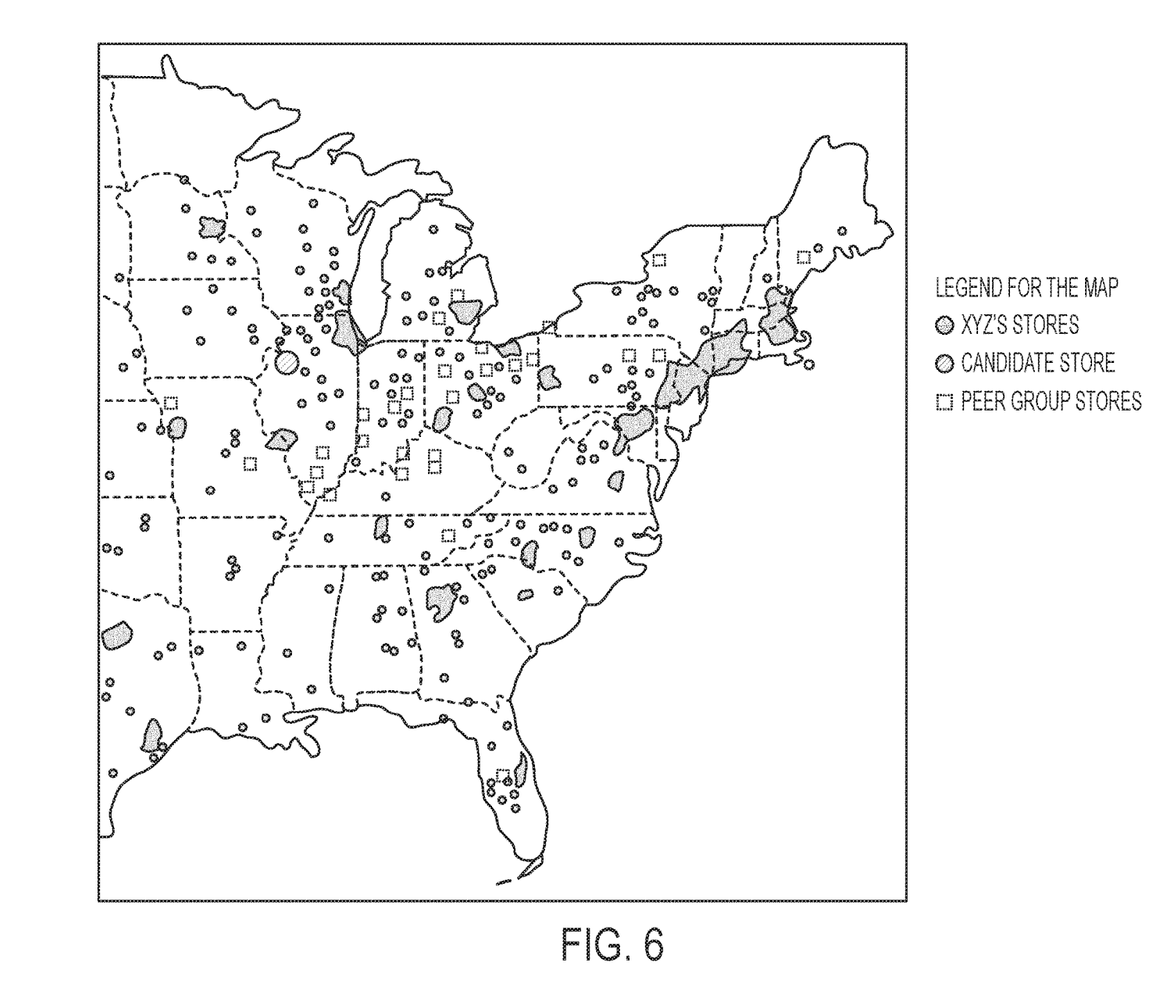
FIG. 6 shows an example of a display map that may be presented on a user interface in one embodiment of the present disclosure.

A user interface, for example, may display a geographical map with graphical legends that may show an organization's stores, candidate stores, and peer group stores. FIG. 6 shows an example of a display map that may be presented on a user interface. Another display in the user interface may present a distortion matrix, e.g., which may include graphical indications of different distortions, e.g., positive distortion, negative distortion, no distortion, slight positive distortion, slight negative distortion. In another aspect, a list of the departments with positive distortions, no distortions, and negative distortions may be displayed or presented on a user interface, for example, in a tabular form.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
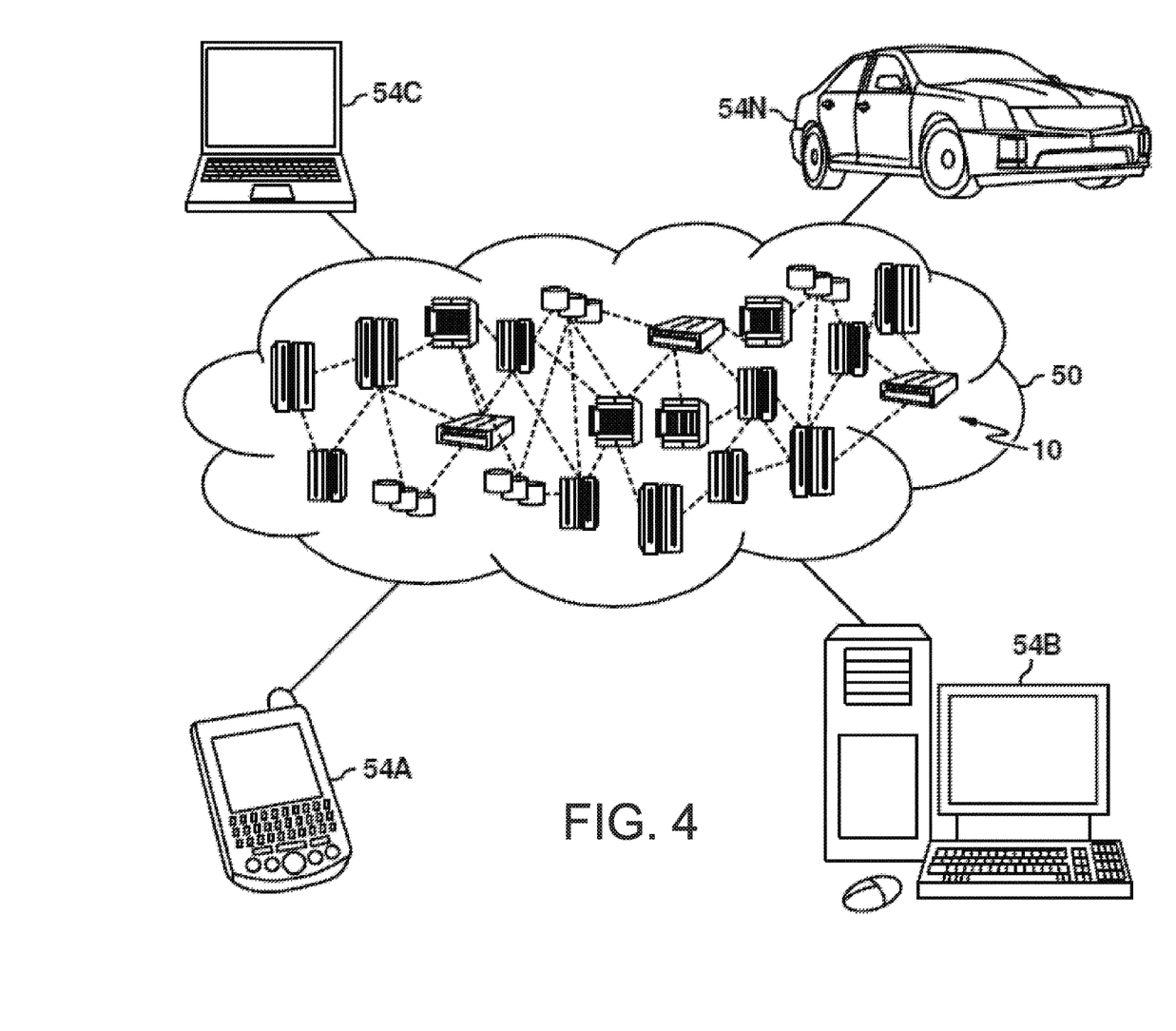
FIG. 4 illustrates cloud computing environment in one embodiment of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
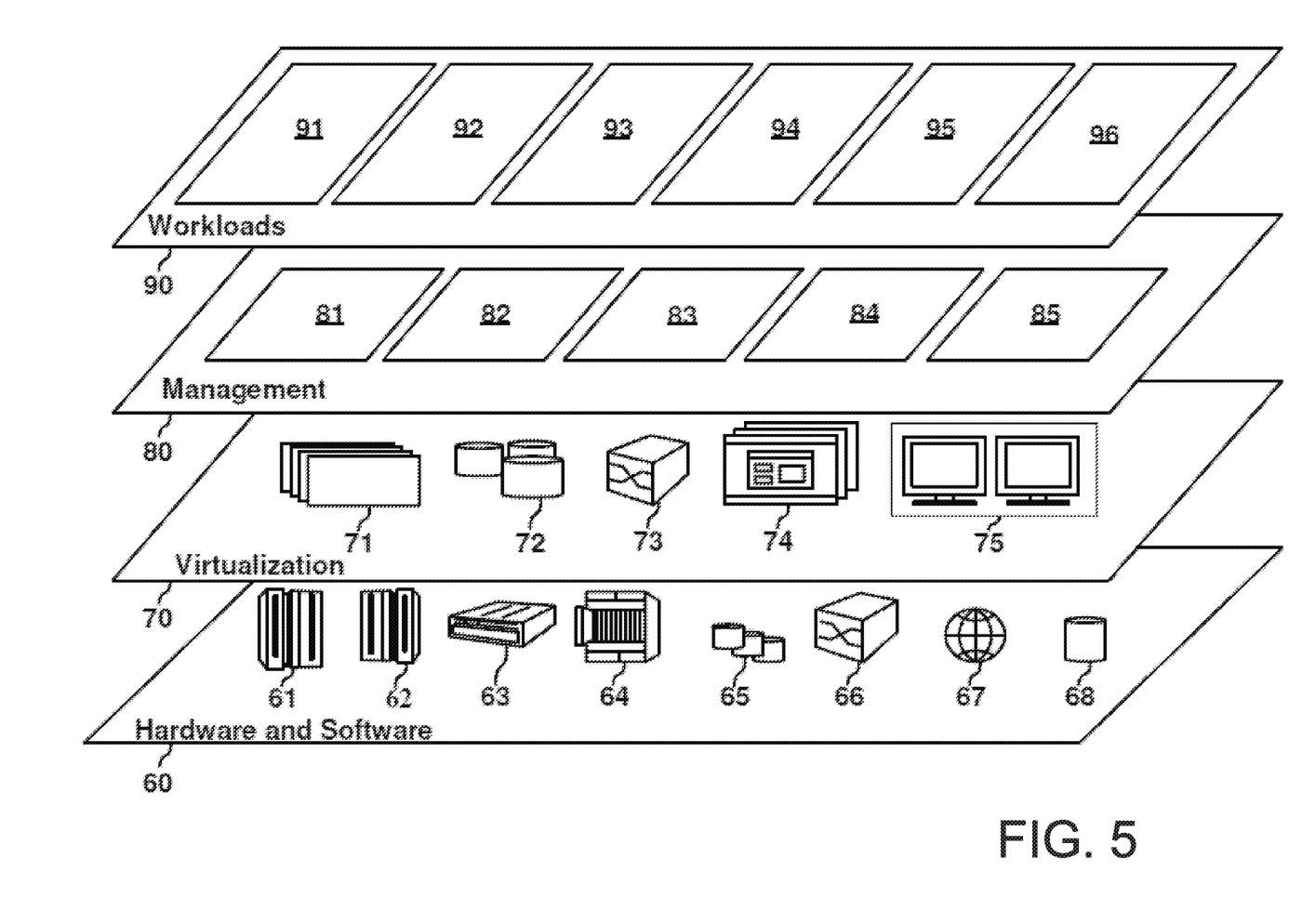
FIG. 5 illustrates a set of functional abstraction layers provided by cloud computing environment in one embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and causal performance store mechanizing analysis processing 96.

Figure 3:
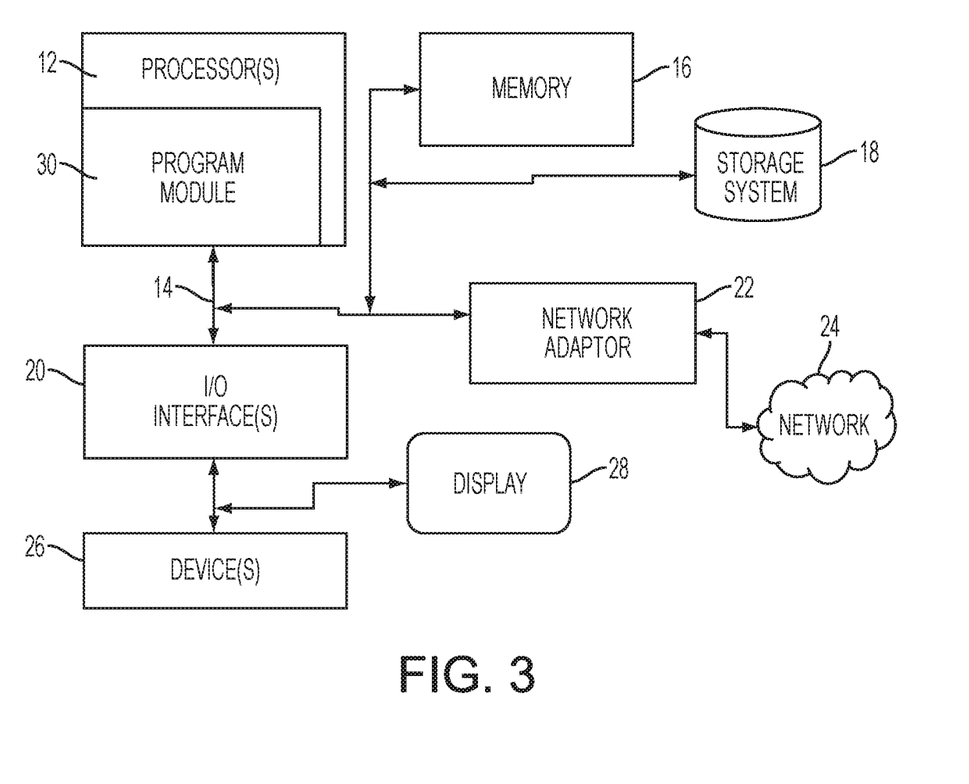
FIG. 3 illustrates a schematic of an example computer or processing system that may implement a causal performance analysis system in one embodiment of the present disclosure.

FIG. 3 illustrates a schematic of an example computer or processing system that may implement a causal performance analysis system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of providing causal performance analysis for store merchandising, the method performed by one or more hardware processors, the method comprising:

receiving via a communication network target store location data associated with a target store location, the target store location data including at least information associated with a competitor within a defined distance of the target store location;

receiving via the communication network existing store data associated with a plurality of existing stores;

performing a clustering technique based on the target store location data and the existing store data, the clustering technique using at least population growth data associated with the target store location and the plurality of existing stores, wherein the population growth data is normalized for the clustering technique;

based on the clustering technique, determining a peer selection group comprising a group of stores determined to have similar attributes to the target store location;

determining sales distortions for a plurality of divisions associated with the group of stores in the peer selection group;

generating a distortion matrix comprising a ranked list of the plurality of divisions; and causing a user interface to present a merchandise mix recommendation for the target store location, the merchandise mix recommendation determined based on the distortion matrix, the merchandise mix specifying a percentage of a total budget to be used in departments of the target store location, which correspond to the plurality of divisions, the user interface further caused to present on a display device a geographical map with graphical legends representing the target store location, the plurality of existing stores, and the group of stores in the peer selection group, wherein the determining sales distortions includes at least determining a performance index per division in the plurality of divisions as a ratio of the division's sales percentage in the peer selection group and the division's sales percentage for all stores.

2. The method of claim 1, further comprising:

automatically selecting the merchandise mix recommendation and performing a what-if-analysis to project a forecast of revenue associated with merchandising performed according to the merchandise mix recommendation; and presenting the forecast of revenue via the user interface device.

3. The method of claim 1, further comprising:

allowing a user to select the merchandise mix recommendation and performing a what-if-analysis to project a forecast of revenue associated with merchandising performed according to the merchandise mix recommendation; and presenting the forecast of revenue via the user interface device.

4. The method of claim 1, wherein the merchandise mix recommendation comprises recommending to maximize the division, responsive to determining that the performance index associated with the division is greater than a first threshold value.

5. The method of claim 1, wherein the merchandise mix recommendation comprises recommending to consider merchandising based on a space constraint, responsive to determining that the performance index falls between a first threshold value and a second threshold value.

6. The method of claim 1, wherein the merchandise mix recommendation comprises recommending to minimize the division responsive to determining that the performance index associated with the division is less than the second threshold value.

7. The method of claim 1, wherein the network target store location data and the existing store data comprise demographic data.

8. A system providing causal performance analysis for store merchandising, comprising:

one or more hardware processors communicatively coupled to a communication network;

one or more of the hardware processors operable to receive via the communication network target store location data associated with a target store location, the target store location data including at least information associated with a competitor within a defined distance of the target store location;

one or more of the hardware processors further operable to receive via the communication network existing store data associated with a plurality of existing stores;

one or more of the hardware processors further operable to perform a clustering technique based on the target store location data and the existing store data, the clustering technique using at least population growth data associated with the target store location and the plurality of existing stores, wherein the population growth data is normalized for the clustering technique;

one or more of the hardware processors further operable to, based on the clustering technique, determine a peer selection group comprising a group of stores determined to have similar attributes to the target store location;

one or more of the hardware processors further operable to determine sales distortions for a plurality of divisions associated with the group of stores in the peer selection group;

one or more of the hardware processors further operable to generate a distortion matrix comprising a ranked list of the plurality of divisions;

one or more of the hardware processors further operable to cause to present via a user interface, a merchandise mix recommendation for the target store location, the merchandise mix recommendation determined based on the distortion matrix, the merchandise mix specifying a percentage of a total budget to be used in departments of the target store location, which correspond to the plurality of divisions, the user interface further caused to present on a display device a geographical map with graphical legends representing the target store location, the plurality of existing stores, and the group of stores in the peer selection group, wherein one or more of the hardware processors are operable to determine sales distortions by determining performance index per division in the plurality of divisions as a ratio of the division's sales percentage in the peer selection group and division's sales percentage for all stores.

9. The system of claim 8, wherein one or more of the hardware processors are further operable to automatically select the merchandise mix recommendation and perform a what-if-analysis to project a forecast of revenue associated with merchandising performed according to the merchandise mix recommendation, and present the forecast of revenue via the user interface device.

10. The system of claim 8, wherein one or more of the hardware processors are further operable to allow a user to select the merchandise mix recommendation and perform a what-if-analysis to project a forecast of revenue associated with merchandising performed according to the merchandise mix recommendation, and present the forecast of revenue via the user interface device.

11. The system of claim 8, wherein the merchandise mix recommendation comprises recommending to maximize the division, responsive to one or more of the hardware processors determining that the performance index associated with the division is greater than a first threshold value.

12. The system of claim 8, wherein the merchandise mix recommendation comprises recommending to consider merchandising based on a space constraint, responsive to one or more of the hardware processors determining that the performance index falls between a first threshold value and a second threshold value.

13. The system of claim 8, wherein the merchandise mix recommendation comprises recommending to minimize the division responsive to one or more of the hardware processors determining that the performance index associated with the division is less than the second threshold value.

14. The system of claim 8, wherein the network target store location data and the existing store data comprise demographic data.

15. A computer program product for providing causal performance analysis for store merchandising, the computer program product comprising a computer readable storage medium having program instructions embodied therewith, wherein the computer readable storage medium is not a transitory signal per se, the program instructions readable by a processor to cause the processor to perform a method comprising:

receiving via a communication network target store location data associated with a target store location, the target store location data including at least information associated with a competitor within a defined distance of the target store location;

receiving via the communication network existing store data associated with a plurality of existing stores;

performing a clustering technique based on the target store location data and the existing store data, the clustering technique using at least population growth data associated with the target store location and the plurality of existing stores, wherein the population growth data is normalized for the clustering technique;

based on the clustering technique, determining a peer selection group comprising a group of stores determined to have similar attributes to the target store location;

determining sales distortions for a plurality of divisions associated with the group of stores in the peer selection group;

generating a distortion matrix comprising a ranked list of the plurality of divisions; and     causing a user interface to present a merchandise mix recommendation for the target store location, the merchandise mix recommendation determined based on the distortion matrix, the merchandise mix specifying a percentage of a total budget to be used in departments of the target store location, which correspond to the plurality of divisions, the user interface further caused to present on a display device a geographical map with graphical legends representing the target store location, the plurality of existing stores, and the group of stores in the peer selection group,     wherein the determining sales distortions includes at least determining performance index per division in the plurality of divisions as a ratio of the division's sales percentage in the peer selection group and division's sales percentage for all stores.

16. The computer program product of claim 15, the method further comprising:

automatically selecting the merchandise mix recommendation and performing a what-if-analysis to project a forecast of revenue associated with merchandising performed according to the merchandise mix recommendation; and     presenting the forecast of revenue via the user interface device.

17. The computer program product of claim 15, the method further comprising:

allowing a user to select the merchandise mix recommendation and performing a what-if-analysis to project a forecast of revenue associated with merchandising performed according to the merchandise mix recommendation; and     presenting the forecast of revenue via the user interface device.

\* \* \* \* \*